United States Patent [19]

Hauser et al.

[11] 4,016,709
[45] Apr. 12, 1977

[54] SAFETY SYSTEM FOR LAWN MOWERS

[75] Inventors: Hans Hauser, Fredericktown; Devin R. Cline, Mount Vernon, both of Ohio

[73] Assignee: The J. B. Foote Foundry Co., Fredericktown, Ohio

[22] Filed: June 23, 1975

[21] Appl. No.: 589,192

[52] U.S. Cl. .................................. 56/10.2; 56/11.8
[51] Int. Cl.² ...................................... A01D 35/26
[58] Field of Search ................. 56/10.2, 11.8, 11.7, 56/11.6, 11.5, 11.3, 10.5; 180/95, 103; 74/242.15 R

[56] References Cited
UNITED STATES PATENTS

| | | | |
|---|---|---|---|
| 2,960,810 | 11/1960 | Musgrave | 56/11.3 |
| 3,543,892 | 12/1970 | Baillie | 56/11.6 |
| 3,590,564 | 7/1971 | Clifford | 56/10.2 |
| 3,628,315 | 2/1971 | Bartholomew | 56/11.6 |
| 3,903,679 | 9/1975 | Sorenson et al. | 56/11.6 |

*Primary Examiner*—Louis G. Mancene
*Assistant Examiner*—James D. Hamilton
*Attorney, Agent, or Firm*—Allen D. Gutchess, Jr.

[57] ABSTRACT

A safety system for a lawn mower is provided for disengaging the blade from the drive when the mower is backing up. The safety system includes a gear which rotates with a wheel of the mower and a toothed member engagable with the gear. When the mower backs up and the gear rotates in one direction, it engages the toothed member and moves it from a first to a second position. A linkage connected with the toothed member and a clutch in the drive train then disengages the clutch and disconnects the mower blade from the drive. When the mower moves forwardly again, the toothed member is moved by the gear back to the first position and the linkage moves the clutch to its engaged position again to rotate the blade by the drive, assuming the shift lever is in its engaged position.

16 Claims, 9 Drawing Figures

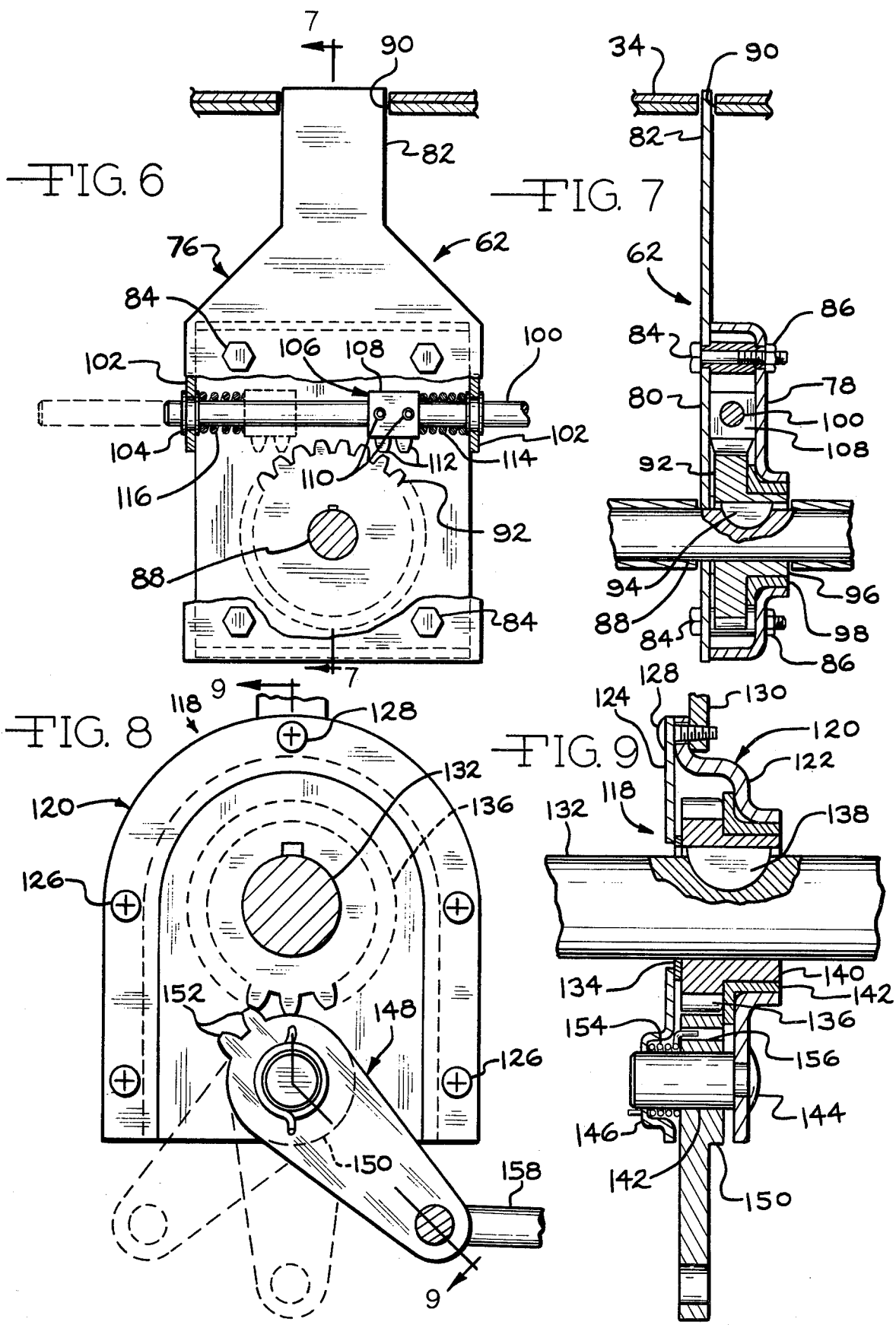

SAFETY SYSTEM FOR LAWN MOWERS

This invention relates to a lawn mower with a safety system for disengaging a mower blade from a drive unit when the mower is backing up.

Lawn mowers, and particularly rotary lawn mowers, have long been highly efficient in causing injuries and damage. Most of the injuries are caused by the rotating lawn mower blade, with many injuries resulting when the mower is being backed up without proper caution. Damage to the mower blade or other mower components, e.g. the drive shaft, can also result if the blade strikes a solid object.

A safety system in accordance with the invention automatically disengages the mower blade from the drive unit when the mower is backing up. The mower blade will be disengaged even if the shift lever is in the engaged position, and the mower blade will once again automatically be engaged with the drive unit when the mower moves forwardly again. If the shift lever is in the disengaged position, then the blade will not be engaged with the drive unit regardless of the direction in which the mower is moving.

It is, therefore, a principal object of the invention to provide a lawn mower with means for automatically disengaging the mower blade when the mower is backing up.

Many other objects and advantages of the invention will be apparent from the following detailed description of preferred embodiments thereof, reference being made to the accompanying drawings, in which:

FIG. 6 is an enlarged, side view in elevation, with parts broken away, of a safety unit of FIG. 1;

FIG. 7 is a view in vertical cross section taken along the line 7—7 of FIG. 6;

FIG. 8 is a view similar to FIG. 6 of a modified safety unit with a front housing plate removed; and FIG. 9 is a view in cross section taken along the line 9—9 of FIG. 8.

Figure 1:
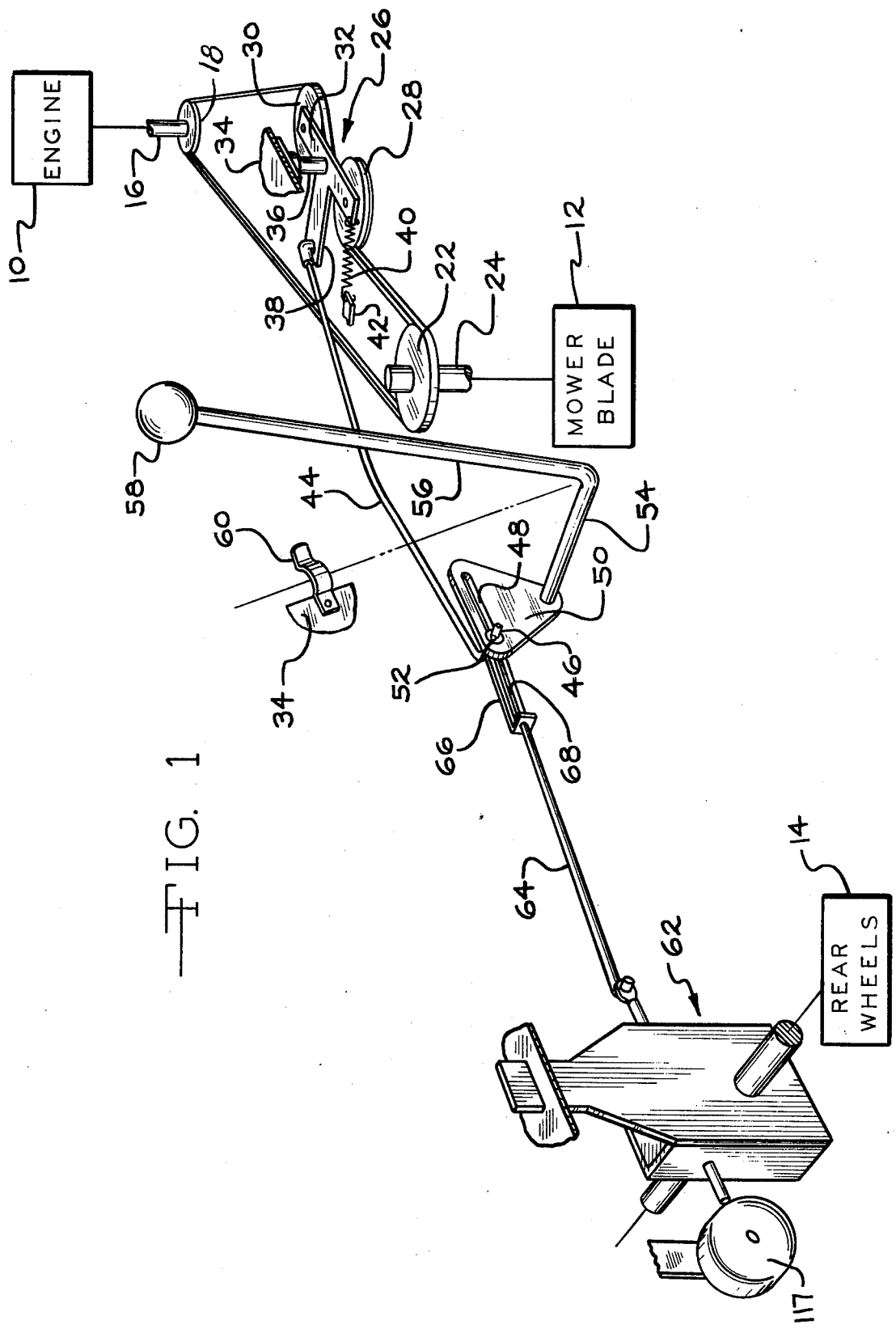
FIG. 1 is a schematic and partly diagrammatic view in perspective of a mower and safety system according to the invention.

Referring to FIG. 1, a lawn mower embodying the invention has an engine or drive unit 10, a mower blade or blades 12 rotated by the drive unit, and rear wheels 14. The engine 10 has a drive shaft 16 and a drive pulley 18 engaged with a belt 20 which is engaged with a driven pulley 22. The pulley 22 connects with the mower blade 12 through a shaft 24.

The engine 10 is connected to and disconnected from the mower blade 12 by a clutch 26. The clutch 26 includes two idler wheels 28 and 30 which are rotatably mounted on an arm 32. The arm 32, in turn, is rotatably supported by part of a mower frame 34 through a pivot shaft 36. The arm 32 has an arm extension 38 extending transversely thereof, with an extremity of the arm 32 also being connected to a spring 40 anchored by a bracket 42 to part of the mower frame. The spring 40 thereby urges the arm 32 continuously in a clockwise direction as viewed in FIG. 1. This also urges the idler pulleys 28 and 30 in a clockwise direction to tighten the belt 20 and effect a connection between the engine and the blade. When the arm 32 and the pulleys 28 and 30 are moved in a counterclockwise direction by a rearward force placed on the arm extension 38, the pulleys cause the belt 20 to slacken and hereby disengage the blade from the engine or drive unit.

The arm extension 38 is pivotally connected to a rearwardly-extending shift rod 44 having a transversely-extending end 46 passing through a slot 48 in a shift lever plate 50 and held therein by a push nut 52. The plate 50 is affixed to a shank 54 of a shift lever 56 extending upwardly and terminating in a handle 58. When the shift lever 56 is in a forward, engaged position and the rod 44 is moved forwardly, the spring 40 urges the arm 32 in a clockwise direction and tightens the belt 20 to enable the engine 10 to drive the blade 12. When the lever 56 is moved back by the operator to a disengaged position in which it is held rearwardly by a spring clip 60 extending from a portion of the frame 34, the rod 44 is similarly moved rearwardly when the transverse end 46 reaches the forward end of the slot 48. The rod 44 thereby rotates the extension 38 and the arm 32 in a counterclockwise direction, overcoming the force of the spring 40. The belt 20 is then slack and the blade 12 is disconnected from the engine 10.

Figure 2:
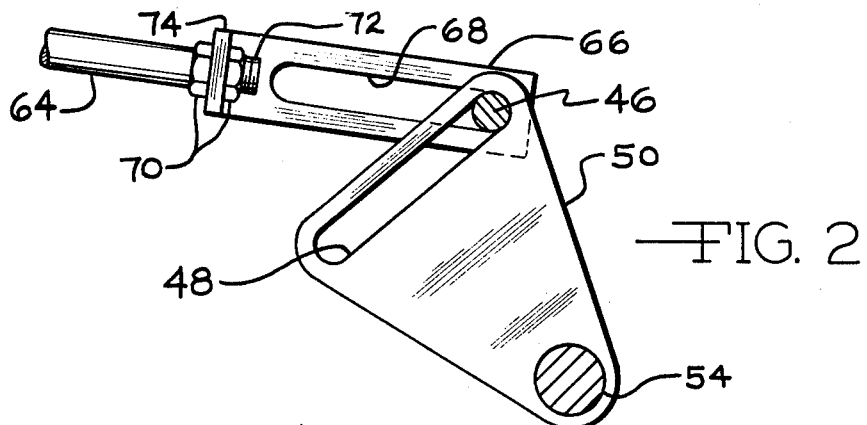
FIG. 2 is a side view in elevation of certain components of the safety system with the shift lever disengaged and the mower backing up.

A safety unit 62 in accordance with the invention is also connected to the shift rod 44 through a link 64 and an elongate member or link 66 having a slot 68 therein, the transverse end 46 of the rod 44 also extending through the slot 68. The details of the safety unit 62 will be discussed subsequently. As shown in FIG. 2, the link 64 is adjustably connected to the elongate member 66 by nuts 70 on a threaded end 72 of the link 64 which extends through a flange 74 of the elongate member 66.

Referring now to FIG. 2, the shift lever 56 is disengaged and the mower is backing up. When the mower is moving in reverse, the link 64 is pulled to a rear retracted position with the shift rod end 46 thereby located at the forward end of the slot 68. The shift lever plate 50 is also in the disengaged position so that the rod end 46 is also near the forward end of the slot 48 in the plate 50. Hence, the clutch 26 is disengaged and the mower blade 12 is not rotated.

Figure 3:
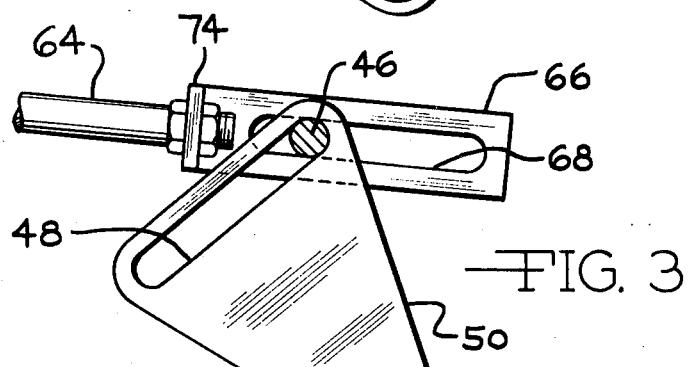
FIG. 3 is a side view in elevation of the same components as FIG. 2 with the shift lever disengaged and the mower moving forwardly.

In FIG. 3, the shift lever 56 is still in the disengaged position but the mower is now moving forwardly. Accordingly, the link 64 is moved forwardly along with the slotted member 66 so that the shift rod end 46 is at or near the rear end of the slot 68. However, the rod end 46 is at the forward end of the slot 48 so that the rod 44 cannot be moved forwardly to the engaged position of the clutch 26, even though it is urged in such position by the spring 40.

Figure 4:
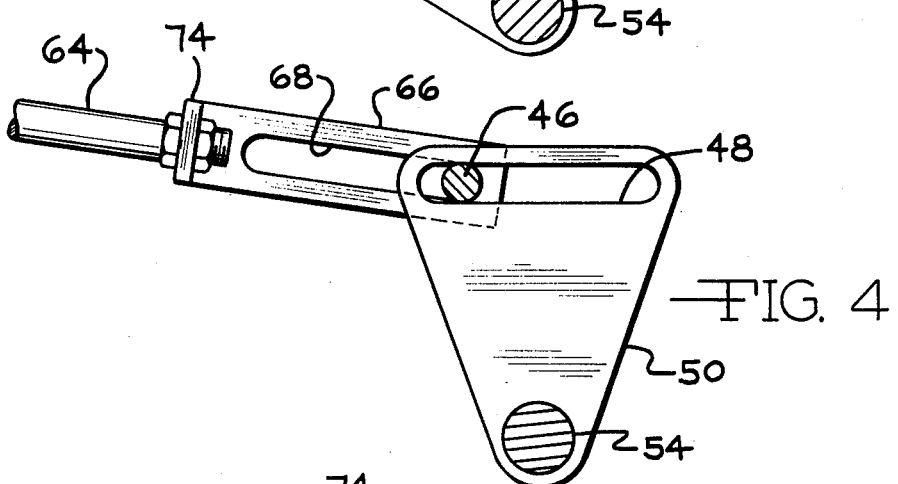
FIG. 4 is a side view in elevation of the same components as FIG. 2 with the shift lever disengaged and the mower backing up.

In FIG. 4, the shift lever has been moved to the engaged position to accordingly move the shift lever plate 50. The rod portion 46 is thereby at or near the rear end of the plate slot 48. However, the rod portion 46 cannot be moved forwardly, even though so urged by the spring 40, since the link 64 and the slotted member 68 have been moved to the retracted position again with the mower backing up. Hence, the clutch 26 remains disengaged.

Figure 5:
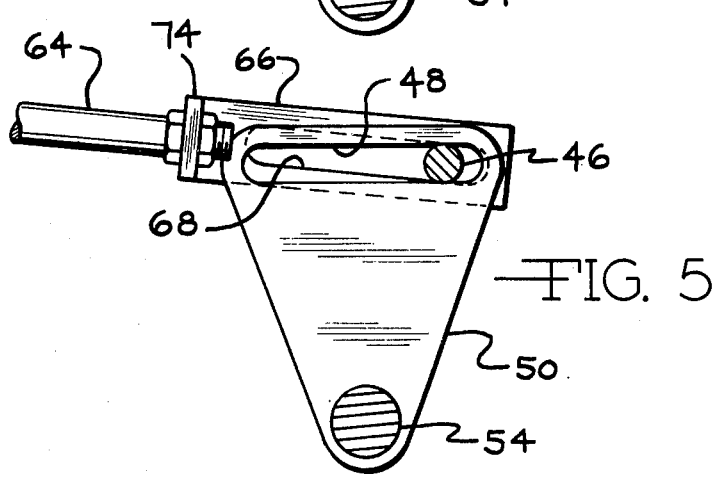
FIG. 5 is a side view in elevation of the same components as FIG. 2 with the shift lever engaged and the mower moving forwardly.

In FIG. 5, the shift lever is in the engaged position and the mower is moving forwardly. Accordingly, the shift rod end 46 can now move forwardly since it is no longer retained by the slotted elongate member 66.

For all four combinations of the shift lever and the mower direction, the clutch 26 can only be engaged when the shift lever 56 is in the engaged position and the mower is moving forwardly. In all other positions, one or both of the slots 48 and 68 in the plate 50 and the elongate member 66 restrain forward movement of the shift rod end 46 and the shift rod 44.

Referring to FIGS. 6 and 7, the safety unit 62 according to the invention includes a housing or cover 76 having a rear part 78 and a front plate 80 with a tang 82 extending upwardly therefrom. The two housing parts are held together by bolts 84 and nuts 86. A rear wheel axle 88 extends through the housing 76 which is prevented from turning by the tang 82 extending through an opening 90 in a portion of the frame 34. A toothed member or gear 92 rotates with the wheels 14, being affixed to the axle 88 by a key 94. The gear 92 has a hub 96 in a sleeve bearing 98 which is held by the housing part 78.

An elongate supporting member or rod 100 extends through the housing 76 and specifically through side flanges 102 of the rear housing part 78, being slidably supported by bushings 104. A second toothed member or gear rack 106 is located on the elongate member 100, having a hub 108 affixed thereto by roll pins 110 and having two depending teeth 112 designed to mesh with the teeth of the gear 92. Two coil compression springs 114 and 116 are also located on the rod 100, on each side of the hub 108. These springs urge the toothed member 106 toward a central position in engagement with the gear 92 from positions on each side of the gear 92.

The operation of the safety unit 62 will now be discussed. Assuming the mower is moving in a forward direction with the shaft 88 turning clockwise, as viewed in FIG. 6, the gear 92 will also be turning clockwise. The toothed member 106 will be pushed to the right by cooperation of its teeth 112 with the gear teeth, thereby compressing the spring 114 to some extent. At this time, the rod 100 will be at its extreme right-hand position with the link 64, which is pivotally connected thereto (FIG. 1), and the slotted elongate member 66 being in the right-hand position, as viewed in FIGS. 3 and 5. This enables the clutch 26 to be engaged if the shift lever is in the engaged position.

If the mower is backing, the gear 92 will move in a counterclockwise direction and the teeth 112 of the member 106 will immediately engage the gear teeth, being urged into engagement by the spring 114. The cooperation of the teeth will then force the toothed member 106 beyond the center position to the dotted line position of FIG. 6, which is similar to the forward position but on the opposite side of the gear 92. The toothed member 106 will then remain in that position as long as the mower is backing up or is stopped after backing up. This movement of the toothed member 106 forces the rod 100 toward the left to the dotted line position and moves the link 64 and the elongate member 66 to the left-hand position of FIGS. 2 and 4 in which the shift rod end 46 moves the clutch 26 to the disengaged position even if the shift lever 56 and the plate 50 are in the engaged position of FIG. 4.

When the mower is moving forwardly and the toothed member 106 is in the solid line position, as well as when the mower is moving rearwardly and the toothed member 106 is in the dotted line position, the teeth 112 will engage the gear teeth and cause a chattering sound. However, this cannot be heard as long as the engine is in operation and so is not objectionable. The sound can be reduced by making the teeth of plastic material or the like. The rod 100 also may oscillate slightly because of the contact of the two sets of the teeth, and this movement can be used to operate a signal, such as ring a bell 117 of FIG. 1, while the mower is backing.

A slightly modified safety unit 118 shown in FIGS. 8 and 9. The unit 118 includes a housing or cover 120 having a rear part 122 and a front plate 124 affixed together by sheet metal screws 126. A longer sheet metal, self-tapping screw 128 also extends through a flange 130 depending from a portion of the frame 34 to prevent rotation of the housing. A rear wheel axle 132 extends through the housing part 122 and the plate 134, being partly sealed at the plate 124 by a ring 134. A gear 136 is affixed to the axle 132 by a key 138 and rotates therewith, the gear having a hub 140 in a sleeve bearing 142 held by the housing part 122. A pivot pin 142 is affixed to the rear part 122 of the housing by a riveted head 144 and extends through a raised portion or boss 146 of the front plate 124.

A toothed member 148 is movably carried by the pin 142 which extends through a hub 146 thereof. The toothed member 148 also has two teeth 152 extending outwardly from the hub and designed to engage the teeth of the gear 136. A torsion spring 154 is located around the pin 142, having one end extending through the plate boss 146 and another end extending into a passage 156 in the toothed member 148. The torsion spring 154 has an unstressed condition when the toothed member 148 is in the vertical dotted line position of FIG. 8 and urges the toothed member 148 toward that position when in each position on opposite sides of the gear 136 as shown in solid lines and dotted lines in FIG. 8.

The toothed member 148 in the solid line position when the mower is moving forwardly and the gear 136 is rotating in a clockwise direction. A link 158 is thus in a forward position and the link 64, which is pivotally connected thereto, and the elongate slotted member 66, are in the forward positions of FIGS. 3 and 5.

When the mower is backing, the gear 136 rotates in a counterclockwise direction and moves the toothed member 148 to the left-hand dotted line position to retract the link 158 along with the link 64 and the elongate slotted member 66 so that they are in the rear positions, as shown in FIGS. 2 and 4, to prevent engagement of the clutch 26.

The torsion spring 154 urges the teeth 152 into engagement with the gear teeth so as to positively move the toothed member 148 in the aforesaid manner when the mower moves forward or backward. Again, the teeth 152 will continue to engage the gear teeth when the mower is moving in either direction but this is not objectionable when the engine is running.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. In combination, a lawn mower having a wheel for supporting the mower above the ground, a rotatable blade, and means for driving said blade, a first toothed member rotatable with said wheel, and means associated with said toothed member for disconnecting said drive means from said blade when said toothed member rotates in one direction.

2. The combination according to claim 1 characterized by said disconnecting means comprises a second toothed member engagable with said first toothed member.

3. The combination according to claim 2 characterized by means for urging said second toothed member toward engagement with said first toothed member.

4. In combination, a lawn mower having a wheel for supporting the mower above the ground, a rotatable blade, and means for driving said blade, a gear rotatable with said wheel, and means for disconnecting said drive means from said blade when said gear rotates in one direction, said disconnecting means comprising a toothed member, and means supporting said toothed member for movement between a position toward either side of said gear.

5. The combination according to claim 4 characterized by means for urging said toothed member toward a position between the two positions and into engagement with said gear.

6. In combination, a lawn mower having a wheel for supporting the mower above the ground, a rotatable blade, and means for driving said blade, means rotatable with said wheel, a clutch having engaged and disengaged positions, a shift lever connected with said clutch for moving said clutch between the engaged and disengaged positions, and means connecting said means rotatable with said wheel and said shift lever for disconnecting said drive means from said blade when said rotatable means rotates in one direction.

7. The combination according to claim 6 characterized by said connecting means comprises a plate with a slot movable with said shift lever and a link between said plate and said means rotatable with said wheel.

8. The combination according to claim 7 characterized by said link includes an elongate member having a slot therein, and said shift lever being connected with said clutch by a rod connected between said clutch and both of said slots.

9. The combination according to claim 8 characterized by said slots being sufficiently long and positioned so that said shift lever can be moved between positions corresponding to the engaged and disengaged positions of said clutch regardless of the direction of movement of said rotatable means, and said disconnecting means can disconnect said blade from said rotatable means when said rotatable means rotates in the one direction regardless of the position of said shift lever.

10. In combination, a lawn mower having a wheel for supporting the mower above the ground, a rotatable blade, and means for driving said blade, means rotatable with said wheel, and means associated with said rotatable means for disconnecting said drive means from said blade when said rotatable means rotates in one direction, and audible signal means, said disconnecting means being effective to operate said audible signal means when said rotatable means rotates in the one direction.

11. A safety unit for a lawn mower having a wheel for supporting the mower above the ground, a rotatable blade, and means for driving said blade, said safety unit comprising a first toothed member rotatable with said wheel, and movable means associated with said toothed member having a first position when said toothed member rotates in a first direction and having a second position when said toothed member rotates in the other direction, and means connected with said moving means to prevent said driving means from rotating said blade when said movable means is in the second position.

12. A safety unit according to claim 11 characterized by said movable means comprises a second toothed member engagable by said first toothed member.

13. A safety unit according to claim 12 characterized by means for urging said second toothed member toward engagement with said first toothed member.

14. A safety unit according to claim 13 characterized by means supporting said second toothed member for movement between positions toward each side of said first toothed member.

15. A safety unit for a lawn mower having a wheel for supporting the mower above the ground, a rotatable blade, and means for driving said blade, said safety unit comprising means rotatable with said wheel, and movable means associated with said rotatable means having a first position when said rotatable means rotates in a first direction and having a second position when said rotatable means rotates in the other direction, means connected with said moving means to prevent said driving means from rotating said blade when said movable means is in the second position, and an audible alarm operated by said movable means when said rotatable means rotates in said other direction.

16. A safety unit for a lawn mower having a wheel for supporting the mower above the ground, a rotatable blade, and means for driving said blade, said safety unit comprising means rotatable with said wheel, and movable means associated with said rotatable means having a first position when said rotatable means rotates in a first direction and having a second position when said rotatable means rotates in the other direction, means connected with said moving means to prevent said driving means from rotating said blade when said movable means is in the second position, a clutch between said blade and said driving means, and means including a shift lever between said connecting means and said clutch to engage and disengage said clutch when said rotatable means rotates in said one direction.

* * * * *